United States Patent [19]

Owen et al.

[11] 4,118,850

[45] Oct. 10, 1978

[54] GASKET FORMING APPARATUS

[75] Inventors: A. B. Owen; Bruce M. Gifford; Horst H. Bahl; Lewis F. Akins, all of Houston, Tex.

[73] Assignee: Lamons Metal Gasket Company, Houston, Tex.

[21] Appl. No.: 693,327

[22] Filed: Jun. 7, 1976

[51] Int. Cl.[2] ............................................. B21D 7/00
[52] U.S. Cl. ................................ 29/243.52; 29/509; 72/76
[58] Field of Search ............... 29/509, 243.5, 243.52; 72/379, 76, 67, 406, 429, 311, 316, 457, 476; 113/54 R, 58

[56] References Cited

U.S. PATENT DOCUMENTS

| | | | |
|---|---|---|---|
| 1,775,864 | 9/1930 | Olson | 72/311 |
| 3,151,657 | 10/1964 | Beranek | 72/125 |
| 3,653,243 | 4/1972 | Ramseier | 72/126 |
| 3,777,687 | 12/1973 | Colman | 113/54 |

Primary Examiner—C.W. Lanham
Assistant Examiner—Gene P. Crosby
Attorney, Agent, or Firm—Pravel, Wilson & Gambrell

[57] ABSTRACT

A metal forming apparatus and method which uses the apparatus for closing the metal shell at a corner of a double jacketed gasket assembly. The apparatus includes a roller hammer means having a metal forming tool rotatably mounted eccentrically in a power-driven rotating tool holder mount for free rotation of the tool relative to the rotating tool holder upon engagement of the tool with a gasket shell. The eccentric mounting provides a reciprocating hammering motion to the tool and the free rotation allows the tool to roll along the gasket shell during engagement to avoid tearing of the gasket shell.

17 Claims, 15 Drawing Figures

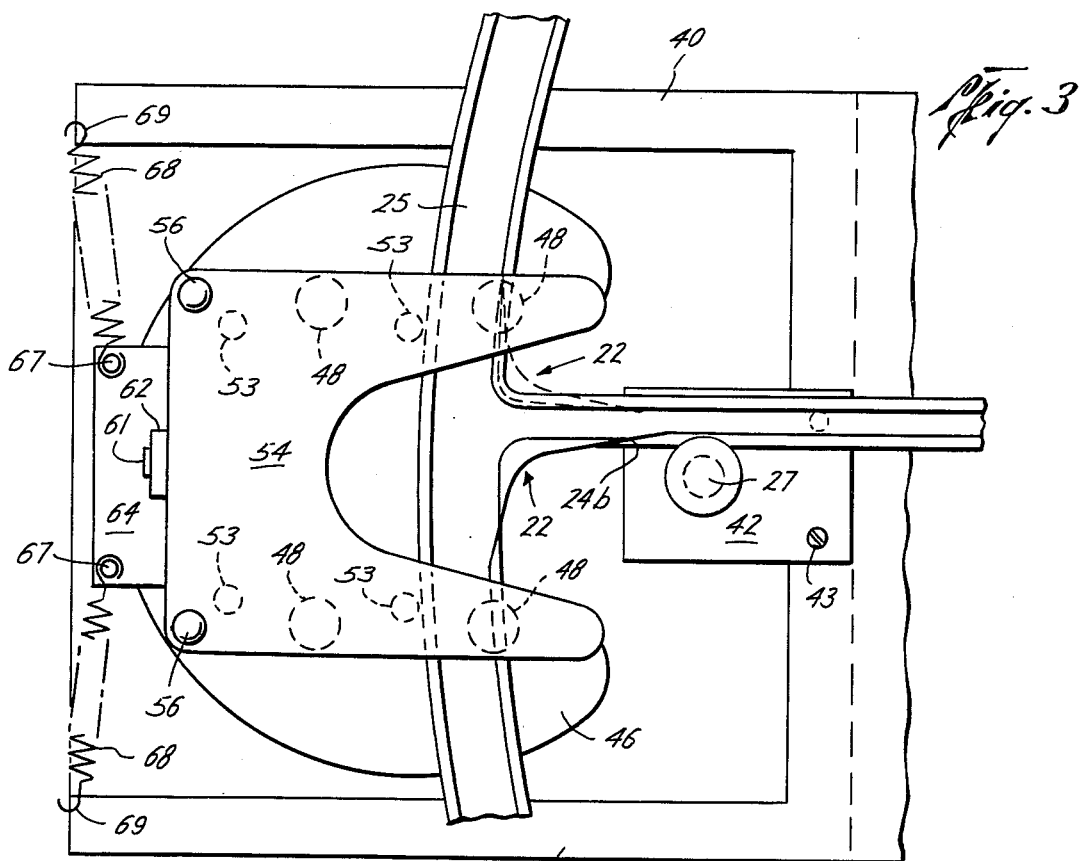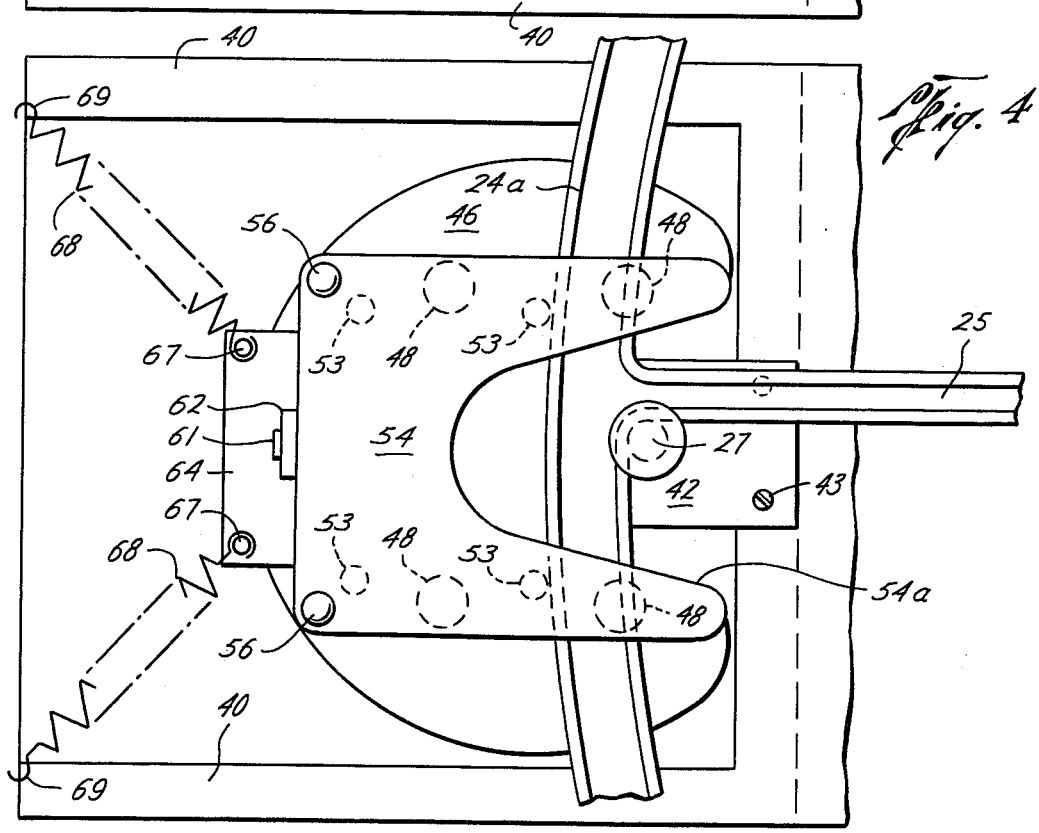

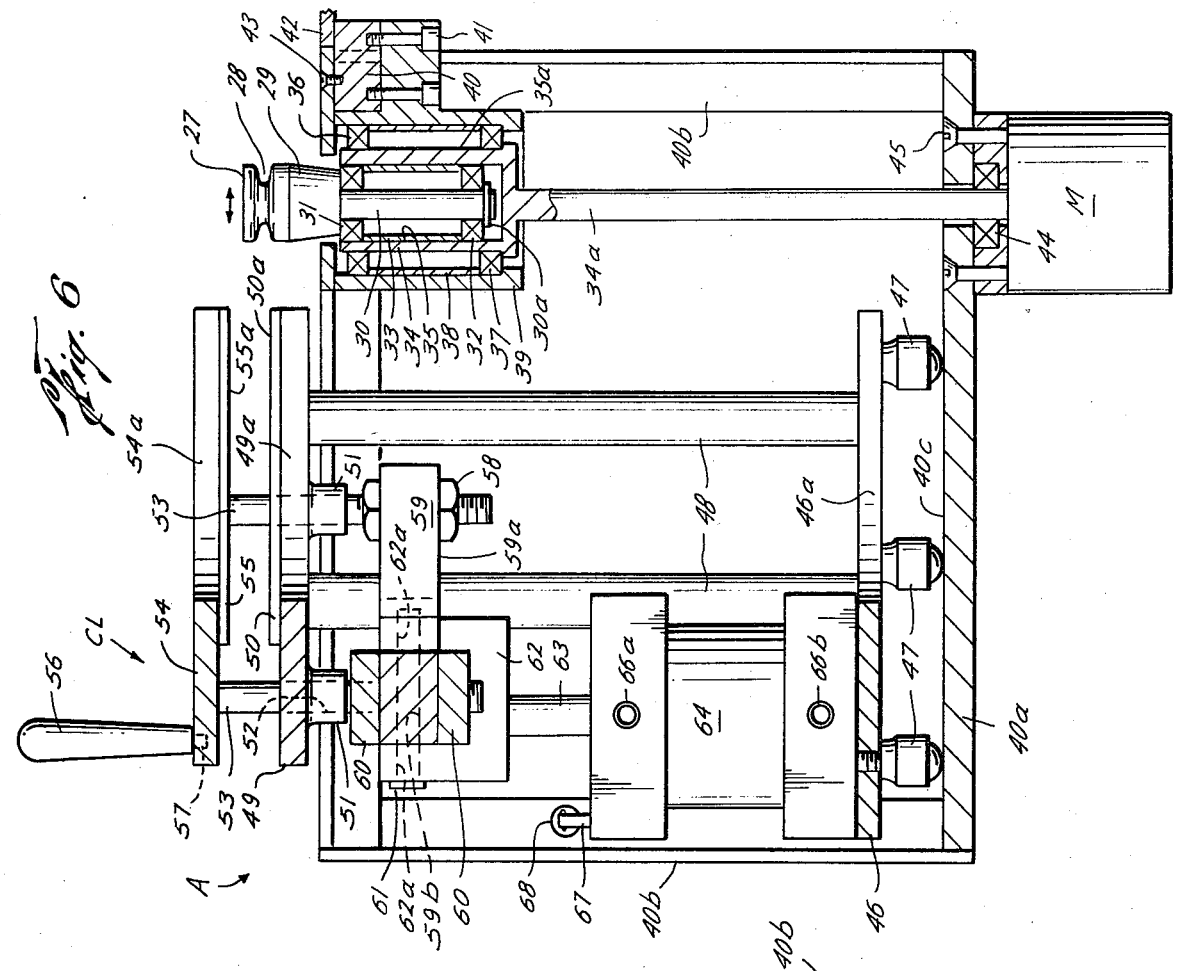
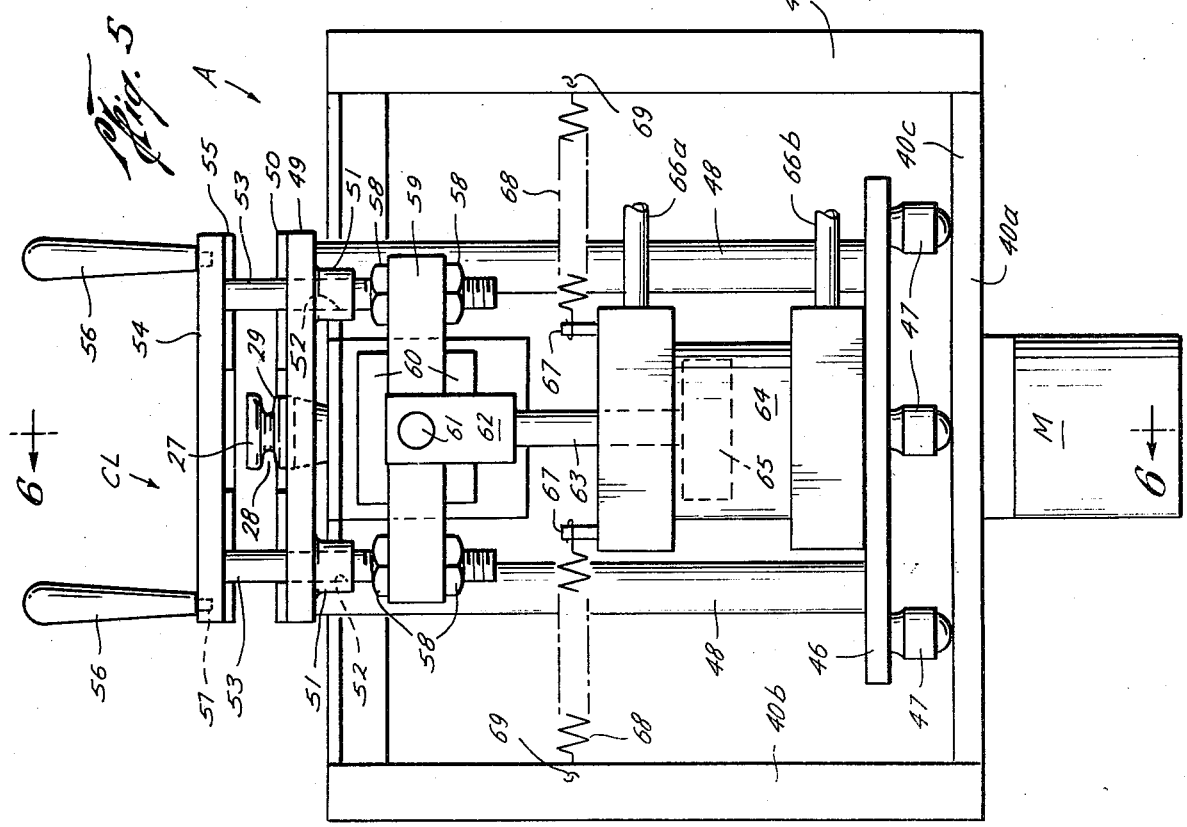

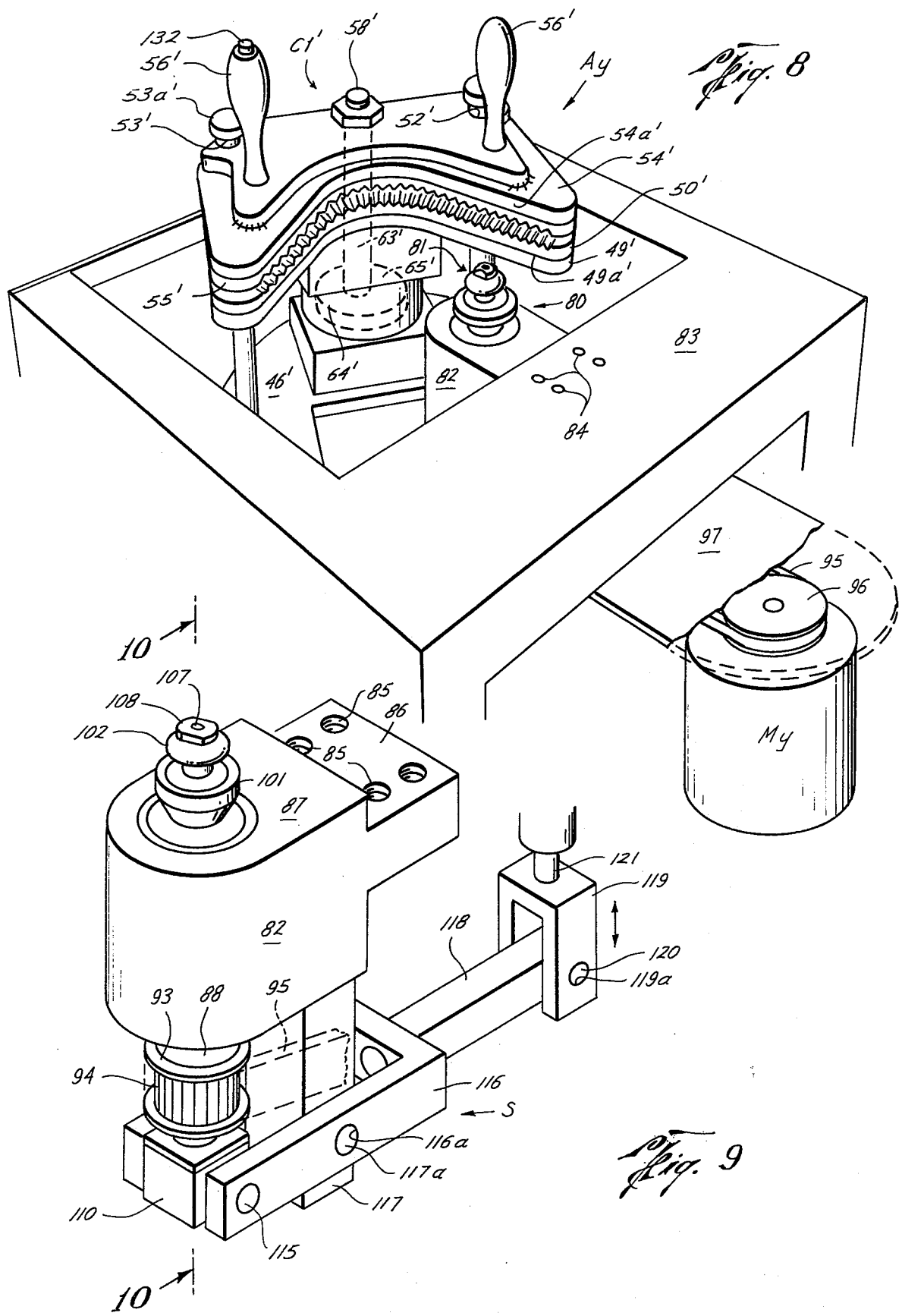

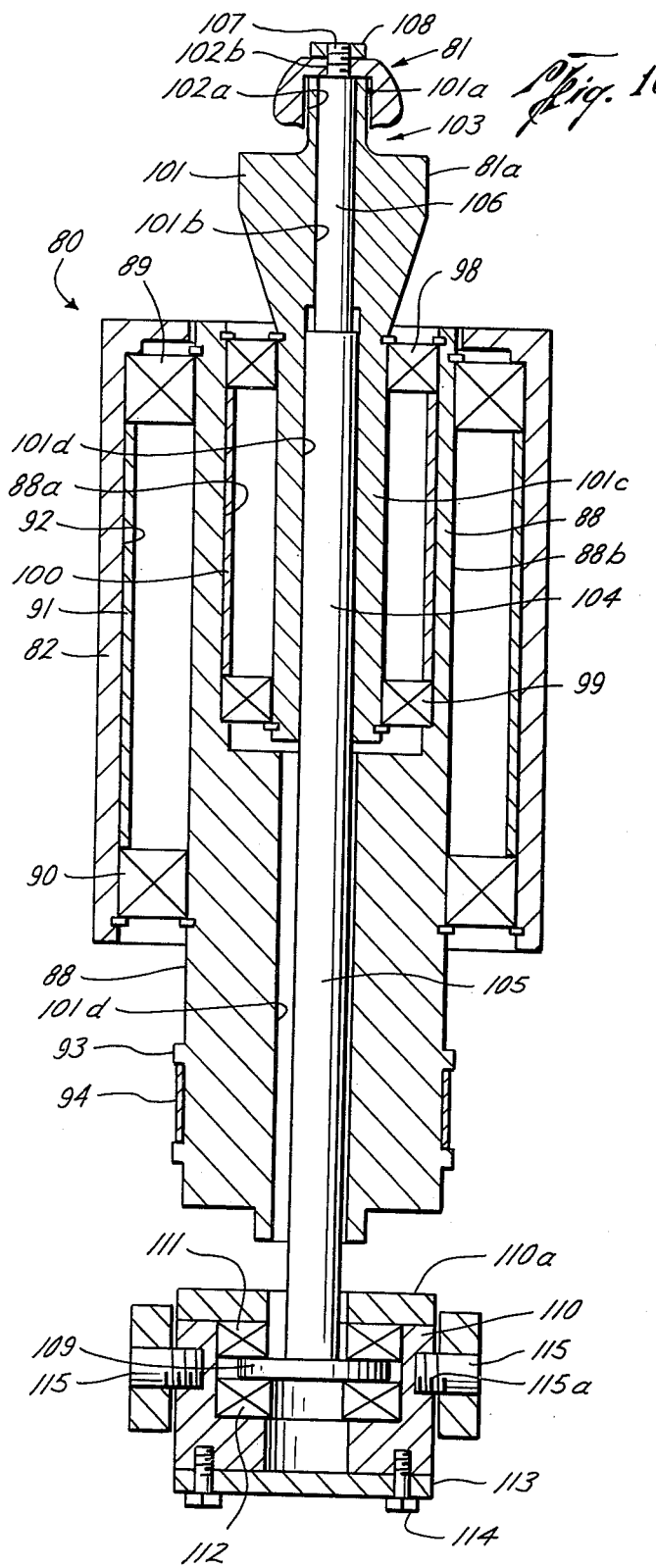
Fig. 10
Fig. 11A
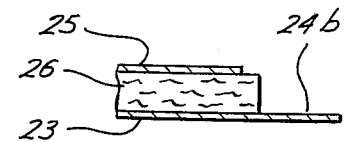
Fig. 11B
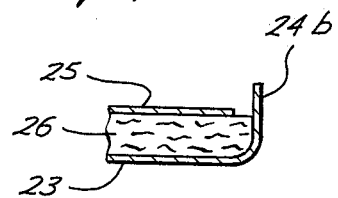
Fig. 11C
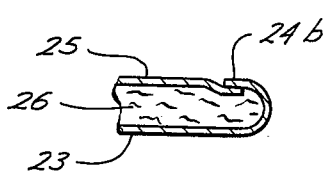

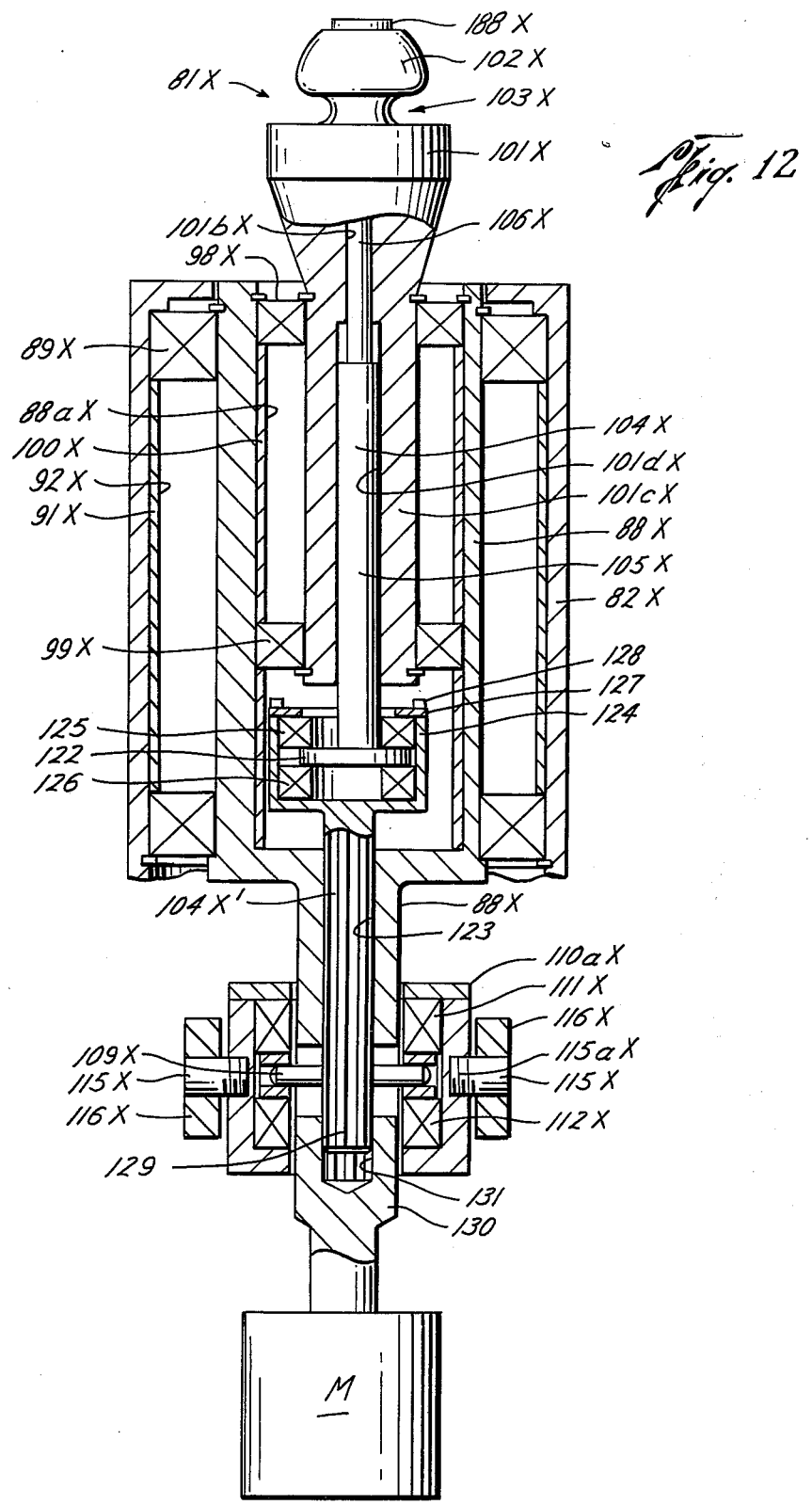

GASKET FORMING APPARATUS

BACKGROUND OF THE INVENTION

This invention relates to the field of metal forming tools for bending metal sheeting and for closing a metal shell at a corner between a curved or straight peripheral surface portion and a straight cross bar surface portion of a double jacketed gasket assembly.

The use of double jacketed gasket assemblies having a thin metal outer shell and a resilient core of insulating material, typically asbestos, is well-known in the prior art. These gasket assemblies may be circular, square or other shapes depending on the shape of the pressure container for which the gasket is designed. These gasket assemblies may have one or more cross bars extending across the gasket for sealing between two sealing surfaces located within the outer perimeter of the gasket.

The cross bars form a relatively sharp corner having a radius of curvature where they join the perimeter of the gasket. Bending the metal shell at this corner to close the gasket assembly causes some stretching of the metal shell at the corner which may result in tearing or crinkling of the metal, particularly if the person forming the corner is inexperienced or careless.

In the past, bending rollers have been used to bend the peripheral circular and straight portions of the gasket shell, but so far as known, it has been a practice in the past to manually close the metal shell at the corners of the cross bars and the gasket assembly with a hammer or other similar hand tool. Such an operation is generally performed by a skilled laborer who uses this technique for bending the metal shell. Even a highly skilled laborer may take as much as a minute or more to close or bend over each corner of a gasket assembly by carefully hammering the metal shell at the corner to avoid tearing the metal.

SUMMARY OF THE INVENTION

This invention relates to a new and improved apparatus and method for using the apparatus for closing the metal shell at an internal corner between a curved or straight peripheral portion and a straight cross bar portion of a double jacketed gasket assembly.

In the preferred embodiment, the apparatus includes roller hammer means having a forming tool which is eccentrically mounted with a power means having power driven rotating tool holder or mounting means so that a hammering reciprocating motion is imparted to the forming tool upon rotation of the tool holder or mounting means. The forming tool is freely rotatable relative to the tool holder to facilitate bending of the metal shell without tearing of the metal sheel since the forming tool can roll along the metal shell during engagement. A holder or clamping means may be provided as a work holder for the work piece or gasket assembly to hold it during engagement with the forming tool. In another embodiment, first and second forming tools may be provided for bending the metal shell in steps so as to avoid tearing of the metal shell. Another embodiment includes a metal forming tool which shifts between at least two positions to form two metal forming tool shapes for bending a metal shell in at least two steps.

BRIEF DESCRIPTION OF THE DRAWINGS

FIG. 3 shows a plan view of an apparatus of this invention with a double jacketed gasket in position for closing a corner thereof.

FIG. 4 is a plan view of an apparatus of this invention with the forming tool engaged with the corner of the gasket for closing the same.

FIG. 5 is a rear view of an apparatus of this invention.

FIG. 6 is a side view, partly in cross-section, of an apparatus of this invention.

FIG. 8 is another embodiment of the clamping means and forming tool of this invention.

FIG. 9 is a partial view of the metal forming tool means in FIG. 8.

FIG. 10 is a partial cross-section taken along line 10—10 in FIG. 9.

FIGS. 11A, 11B, and 11C are partial cross-sectional views showing an unclosed gasket corner, a partially closed gasket corner and a fully closed gasket corner, respectively.

FIG. 12 is a partial cross-section of another metal forming tool means for use with the apparatus of FIG. 8.

BRIEF DESCRIPTION OF THE PREFERRED EMBODIMENTS

Figure 1:
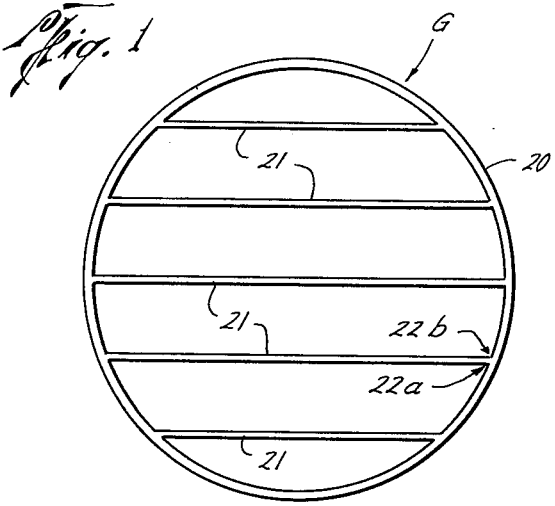
FIG. 1 is a plan view of a double jacketed gasket to which the apparatus and method of this invention has application.

Double jacketed gasket A which may be formed with the apparatus and method of this invention is shown in FIG. 1. The gasket includes an outer peripheral portion 20 having uniform cross-section and which in this case is shown as circular. The gasket may also have other shapes corresponding to the particular application in which the gasket is used. A plurality of cross bars 21 are connected with the peripheral portion and form a continuous portion of the gasket. The number of cross bars varies according to the application and may require only a single cross bar. At each point of joining of the cross bar with the gasket, such as at corners 22a and 22b, relatively sharp angles are formed by the cross bar and a tangent to the gasket periphery with each corner having a radius of curvature. It is the closing or bending of the metal shell, as explained hereafter, at these and the ohter corners formed by the cross bars which the new and improved apparatus and method of this invention has particular application. Double jacketed gaskets having cross bars are not themselves new having been known in the art.

Figure 2A:
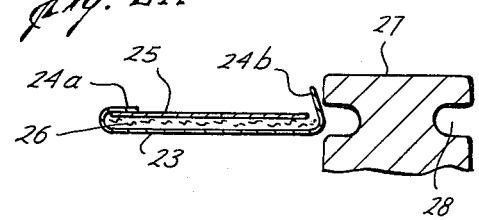
FIG. 2A shows a cross-section of an unclosed corner of a double jacketed gasket prior to engagement with the forming tool.

A cross-section of the unclosed corner portion of a double jacketed metal gasket of this invention is shown in FIG. 2A. The double jacketed gasket includes an outer shell 23 having an outer peripheral leg portion 24a which may, for example, be at the outer periphery of the gasket and an inner corner leg portion 24b which may be at the gasket corner 22a or 22b. As will be apparent in FIG. 2A, the corner leg portion 24b has only been partially closed and must be bent downwardly to a position such as the outer leg portion 24a. Although not shown in the cross-section shown in FIG. 2A and FIG. 2B, it is understood that the corner leg portion is curved and the gasket corner varies in cross-section size at different locations at each corner as is apparent when viewed from a plan view such as shown in FIG. 3 and 4. A flat shell closure means 25 completes the metal shell of the gasket for enclosing the resilient gasket material 26 which may be asbestos or the like. A roller hammer means having metal forming tool 27 is also shown in cross-section in FIG. 2A to illustrate the shape of the forming notch 28 which is used to bend the corner leg portion 24b downwardly flush with the shell closure means 25.

Figure 2B:
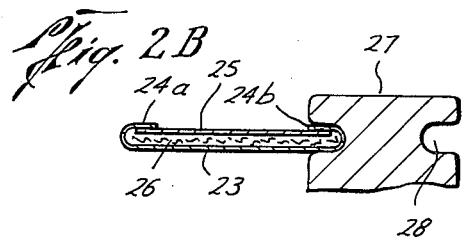
FIG. 2B shows the corner of a double jacketed gasket engaged with the forming tool for closing the corner of the gasket.

A hammering reciprocating motion is imparted to the forming tool 27 of the roller hammer means, as hereafter explained, and upon engagement with the corner leg portion 24b of a corner bends this corner leg portion downwardly to the position shown in FIG. 2B. Because of the radius of curvature at the corner, stretching of the metal shell 23 in the area of the corner leg portion 24b occurs as a result of this bending back and down of the leg portion to close the corner of the gasket shell. The significance of this stretching to the disclosed invention will be apparent hereinafter.

Apparatus A of an embodiment of this invention is shown in FIGS. 5 and 6. The metal forming tool 27 of the roller hammer means is shown as having a lower body portion 29 and a stem member 30. The central axis of the stem member 30 coincides with the central axis of the circular forming notch 28 such that the forming tool is concentric relative to the stem central axis. An upper bearing 31 is mounted with the stem 30 and a lower bearing 32 is likewise mounted with the sem. A snap ring 30a or other suitable retaining means is provided to retain the stem 30 within the bearings 31 and 32 for rotation thereto. A cylindrical sleeve 33 is connected with the bearings and mounted concentrically with the axis of rotation of the forming tool.

A mounting means having tool holder 34 which receives the metal forming tool and bearing supports within its cylindrical opening defined by inner surface 35. The tool holder 34 is rotatably mounted with the holder support member 39 through upper bearing 36 and lower bearing 37 which are connected by a cylindrical retaining sleeve 38. The member 39 is connected with the frame cross member 40 by bolts 41. A plate 42 is also secured with the frame cross member with screws 43. The tool holder 34 includes a downwardly extending power drive shaft 34a which is mounted concentrically with the cylindrical surface portion 35a of the tool holder, which surface portion is rotatably mounted in the bearings 36 and 37. The power drive shaft 34a is operably connected with an electric motor M which includes bearing 44 which rotatably supports the shaft. The motor M is connected with the frame base plate 40a by screws 45 and an electrical power supply, not shown, is provided for the motor M. A plurality of vertical frame members 40b connect the base plate 40a with the upper frame cross members 40.

The interior cylindrical opening of the tool holder defined by inner surface 35 has its central axis displaced from the central axis of the power drive shaft 34a and the central axis of the cylinder defined by the outer surface 35a of the tool holder in order to provide an eccentric mount for the metal forming tool 27. The differences in the thickness of the walls of the metal tool holder 34 are exaggerated somewhat in FIG. 6 to illustrate the eccentric relationship of the interior opening for mounting the metal forming tool 27 eccentrically relative to the axis of the power drive shaft 34a. When electrical power is supplied to the motor M, the power drive shaft 34a and tool holder 34 are rotatably driven to provide a hammering reciprocating motion to the metal forming tool 27 due to the eccentricity of the opening in the tool holder in which the metal forming tool is rotatably mounted. The bearings 31 and 32 allow free rotation of the metal forming tool 27 relative to the rotation of the power drive shaft 34a and the tool holder 34 for a reason that is hereafter described. These bearings enable the metal forming tool to roll along the corner of the gasket while the rotation of the power drive shaft provides a hammering reciprocating motion to the metal forming tool.

A holder or clamping means CL is provided to particularly adapt the metal forming tool of this invention for use with closing the corners of double jacketed gaskets. The clamping means includes a base portion 46 having secured thereto a plurality of supporting rollers 47 which roll on the top surface 40c of the frame base plate 40a. The base member 46 includes a notched out portion 46a so that the clamping means may be moved to the right as shown in FIG. 6 with the notched out portion allowing clearance for the power drive shaft 34a. Rigidly secured to the base member 46 are a plurality of upright frame members 48 which are in turn rigidly connected to lower clamp member 49. A rubber pad 50 is provided on the clamp member to protect the double jacketed gasket that is clamped in the member and to prevent slipping of the gasket when clamped. Tread-like grooves may be formed in the pad to resist such slipping. Lower clamp member includes a notched out portion 49a like the notched portion 46a in the base portion 46. The notched portion 49a allows the clamping means to be moved forward (to the right in FIG. 6) so that the metal forming tool 27 will engage a gasket corner of a gasket held in the clamp. The distance from the top surface 50a of the rubber pad is positioned relative to the top surface 40c to coincide with the forming notch 28 of the metal forming tool. A plurality of bushings 51 are formed integral with the lower clamp member and have apertures 52 extending thereto for supporting sliding rods 53.

Rigidly connected with the upper ends of the sliding rods 53 is an upper clamp member 54 which has the same general shape as the lower clamp member 49. The shape of the upper clamp member showing the notched portion 54a is best shown in FIGS. 3 and 4. It is understood that the notched portions 49a and 46a have the same general shape as the notched portion 54a as shown in FIGS. 3 and 4. A rubber pad 55 having a clamping surface 55a is secured with the upper clamp member 54 and serves the same purpose as the rubber pad 50 to protect the gasket while rigidly clamping it between the rubber pads. Two hand grips 56 are mounted with the upper clamp member at laterally spaced positions by suitable means, such as studs 57. The hand grips 56 are adapted to be gripped by an operator for moving the clamping means on rollers 47 upon the frame base plate 40a as will hereafter be explained.

The lower end 53a of the sliding rod is threaded to receive threaded taps 58 thereon. As best shown in FIGS. 3 and 4, there are four sliding rods 53 rigidly connected to the upper clamp member 54. A bracket 59 has four apertures positioned to receive the four sliding rods as shown in FIGS. 5 and 6. This is accomplished by placing the upper tap 58 on the lower threaded portion 53a on each sliding rod and then positioning the bracket member 59 on the threaded portion and then positioning lower tap 58 on the threaded portion. As will be apparent, the positions of the upper and lower taps 58 may be changed on the sliding rods 53 to provide for adjustment of the bracket relative to the sliding rods. Bracket 59 includes a notched out portion 59a coinciding with the shape of the notched out portions 49a and 54a to provide clearance for the metal forming tool. A plurality of reinforcing spacer plates 60 are secured with the bracket 59 to provide reinforcing adjacent the aperture 59b which extends through the bracket. The aperture 59b is adapted to receive a pin 61 which also extends through apertures 62a in bifurcated member 62. Connected to the lower portion of the bifurcated member 62 is a reciprocating piston rod 63 which extends from power cylinder 64.

The power cylinder 64 includes a piston member 65 (FIG. 5) which is adapted to be reciprocated within the power cylinder 64. Supply lines 66a and 66b supply pressurized air to opposite sides of the piston 65 to cause the piston 65 and reciprocating piston rod 63 to reciprocate within the power cylinder 64. When pressurized air is supplied to upper supply line 66a, the piston 65 is forced downwardly which in turn acts on the bracket member 59 to pull the sliding rods 53 downward. This in turn clamps the upper clamp member 54 tightly against the lower clamp member 49. In practice, the work piece or double jacketed gasket is inserted between the upper and lower clamp members and pressurized air is applied to the upper supply line 66a to tightly clamp the work piece between the upper and lower clamp members. When the upper supply line 66a is exhausted and pressurized air is supplied to the lower supply line 66b, the upper clamping member is returned to the position shown in FIGS. 5 and 6 whereby the work piece is released. Although an air cylinder is used to actuate the clamping means, it is understood that an electric solenoid, hydraulic cylinder or other suitable means could likewise be used. Suitable control means including an air supply and a foot actuated control valve (not shown) may be provided for controlling the power cylinder 64. The power cylinder 64 is secured to the base portion 46 of the clamping means.

Pins 67 are connected with the upper portion of the power cylinder 64 and are adapted to receive the hook ends of spring 68. The opposite hook ends of the spring 68 are inserted through apertures 69 in frame upright supports 40b. The spring 68 acts to pull the clamping means away from the metal forming tool to a position best shown in FIG. 3. The strength of the spring 68 is such that the clamping means may be easily rolled toward the metal forming tool as shown in FIG. 4 yet will still return the clamping means to the position shown in FIG. 3 upon release of the clamping means hand grips 56 by an operator.

Figure 7:
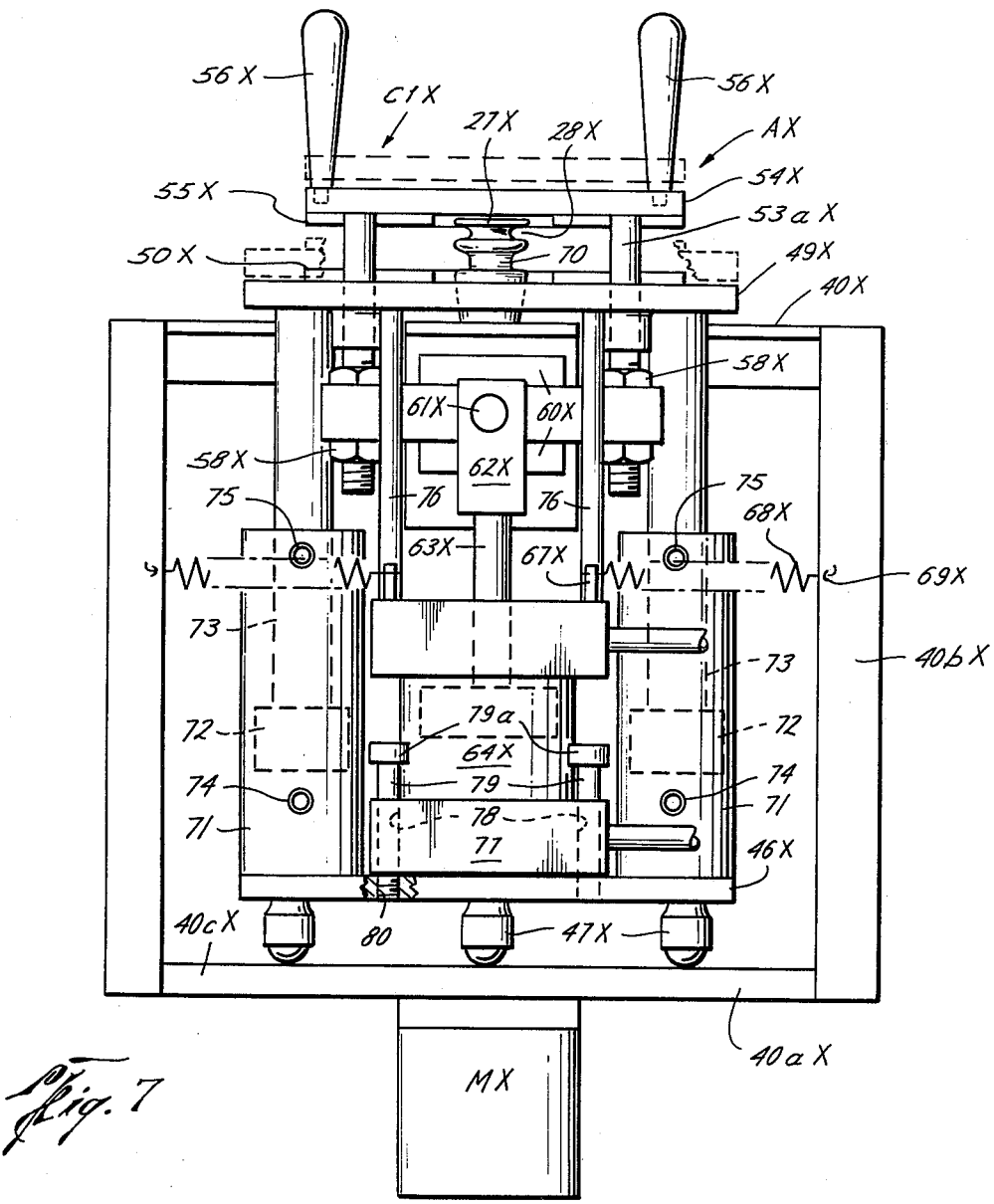
FIG. 7 is another embodiment of an apparatus and forming tool of this invention.

Another embodiment of the apparatus is shown in FIG. 7. Numerous components of the apparatus in FIG. 7 are common to the embodiment, described above so corresponding components of the version of FIG. 7 are given the same reference numerals as their counterpart components in FIGS. 5–6 with the subscript "X" added to the reference numeral in FIG. 7.

The apparatus Ax of FIG. 7 includes a metal forming tool 27x which is similarly mounted eccentrically in a tool holder as is the metal forming tool 27. The metal forming tool 27x includes a metal forming notch 28x corresponding to the notch 28 in the metal forming tool 27. This metal forming notch 28x performs the operation as shown in FIGS. 1A and 2B and described above. An additional metal forming notch 70 is provided to perform an initial metal forming operation with the corner portion 22 of the gasket G. The corner leg portion 24b as shown in FIG. 2A is initially in a horizontal position coinciding with the plane of the metal shell 23 as shown in FIG. 11A. The shape of the notch 70 will bend the corner leg portion 24b from a horizontal position to an upperly extending position as shown in FIG. 2A and FIG. 11B. After performing this initial metal forming operation, the corner of the gasket may be engaged with the metal forming tool 28x to complete the operation, such as shown in FIG. 2B.

The mechanism for alternatively positioning the gasket corner for engagement with the metal forming notch 70 or the metal forming notch 28x includes a clamping means CLx having two power cylinders 71 which are secured to the base portion 46x. These power cylinders 71 include pistons 72 and piston rods 73 which are reciprocally mounted within the power cylinder 71. The upper end of the piston rods 73 are rigidly secured with the lower clamp member 49x such that reciprocating movement of the piston rods likewise moves the lower clamp member from the position shown in solid lines in FIG. 7 to the position shown in broken lines in FIG. 7. Pressurized air is supplied to the lower air supply line 74 to move the pistons and piston rods upwardly and pressurized air is supplied to the upper air supply lines 75 to move the piston and piston rods downwardly. The piston rods 73 are substituted for the upright members 48 which are used on the embodiment shown in FIGS. 5 and 6. The power cylinder 64x is secured at its upper portion to connecting members 76 which are in turn secured with the lower clamp member 49x. The base member 77 of the power cylinder 64x includes apertures 78 which slidably receive pins 79 for up and down movement of the power cylinder 64x relative on the pins. The pins 79 include screw threads which screw in threaded openings 80 in the base member 46x. Enlarged portion 79a of the pins 79 limit upward movement of the power cylinder 64x relative to the base plate 46x. The remaining components of the modified clamping means CLx are not described in detail but are designed with reference numerals having a subscript "X" and reference can be made to the corresponding components and reference numerals of the clamping means CL for their operation.

Another version Ay of the apparatus of this invention is shown in FIG. 8. This apparatus includes numerous components in common with the apparatus A and Ax. The roller hammer means 80 used with this apparatus includes an adjustable tool 81 which may be shifted between two positions to perform the two bending operations as shown in FIGS. 11A, 11B and 11C, and explained below.

The details of the roller hammer means is best shown in FIGS. 9 and 10 and reference is made to these figures for the detailed structure. The roller hammer means includes a housing means 82 which is secured to the upper frame member 83 of the apparatus frame. Suitable fasteners such as screws or bolts 84 are inserted in apertures in the upper surface member and screwed into threaded apertures 85 of the housing means. The housing means 82 includes recessed attaching portion 86 which is adapted to abut the under surface of the upper frame member 83 so that the surface portion 87 of the housing is positioned flush with the upper surface of the upper frame member 83.

As best shown in FIG. 10, the housing means 82 has an opening for mounting of the metal forming tool means 80. Power driven tool holder means 88 is rotatably mounted with the housing through upper bearing means 89 and lower bearing means 90. Mounting sleeve 91 is secured with the inner surface 92 of the housing and with the upper and lower bearings 89 and 90. The inner cylindrical opening 88a of the rotating tool holder means is eccentrically positioned with respect to the outer cylindrical surface 88b of the tool holder for the same reasons noted above with respect to the other tool holders described and as further explained below. The lower portion of the tool holder means 88 includes a drive pulley 93 mounted thereon with the drive pulley having suitable gear-like teeth 94 for use with a flexible drive belt having mating teeth thereon. Such a drive belt 95 as shown in broken lines in FIG. 9 and drive belts of this type are well-known in the art. A motor means My is mounted with the frame of the apparatus and includes another drive pulley 96 which drives the belt 95 which in turn drives the tool holder 88. A suitable shield 97 is provided to protect workmen from the drive system.

The metal forming tool 81 is rotatably mounted with the tool holder 88 through an upper bearing means 98 and a lower bearing means 99. Cylindrical mounting sleeve 100 is mounted with the inner surface 88a of the tool holder and with the upper and lower bearings 98 and 99. The central axis of the tool 81 is eccentrically mounted relative to the central axis of the rotating tool holder 88 to provide the reciprocating hammering motion upon rotation of the tool holder 88, which reciprocating hammering motion may be used to close a gasket corner on a double jacketed gasket.

The metal forming tool 81 differs from the previously described metal forming tools in that it includes a lower metal forming component 81a and an upper metal forming component 102 which upper component is longitudinally shiftable relative to the lower metal forming component to vary the shape of the metal forming notch 103 to perform the twostep bending operation as shown in FIGS. 11A, 11B and 11C. The lower position of the upper metal forming component 102 is illustrated in FIG. 10. The upper extended position of component 102 is not illustrated. The upper metal forming component includes an inner cylindrical opening 102a which is slidably mounted on cylindrical member 101a at the upper portion of the lower metal forming component 101. A centrally located aperture 101b extends through the lower metal forming component 101 and the upper cylindrical portion 101a. The lower metal forming component includes a sleeve portion 101c which is rotatably mounted with the bearings 98 and 99 and which includes a centrally located aperture 101d which is slightly larger than the aperture 101b. Slidably mounted in the apertures 101b and 101d is a tool shifting rod 104 which includes a lower shifting rod portion 105 having a diameter slightly smaller than the aperture 101d for sliding movement thereto and an upper rod portion 106 having a diameter slightly smaller than the aperture 101b for sliding movement relative thereto. The upper metal forming component includes an aperture 102b through which a stud 107 on the upper rod portion 106 extends. The aperture 102b and the stud 107 are slightly smaller than the upper rod portion 106 for securing the metal forming component with the sliding rod 104. A tap 108 is positioned on the threaded stud 107 for securing the upper metal forming component with the sliding rod. The sliding rod 104 includes a disk portion 109 secured thereon for the reason as explained hereinafter.

A shifting means S is operably secured with the shifting rod 104 for shifting the upper metal forming component 102 between its two positions, the lower of which is shown in FIG. 10. The shifting means includes a housing means 110 having upper closure plate 110a and having upper thrust bearing means 111 and lower thrust bearing means 112 for rotatably mounting the disk 109 for lateral shifting relative to the housing 110. The shifting rod 104 will tend to rotate with the tool holder means 88 when a work piece is not engaged with the metal forming notch 103 and bearings 111 and 112 make this rotation possible. A plate member 113 which completes the housing enclosure is secured to the housing 110 by suitable means such as bolts 114. Secured on opposite sides of the generally square housing 110 are pin members 115 which are adapted to be mounted with the shifting yoke member 116. The pin members 115 are mounted with the housing 110 by suitable means such as screw threads 115a.

The shifting means S further includes pin members 117a (only one of which is shown in FIG. 9) which are secured with the apparatus frame member 117 and mounted in apertures 116a in the yoke member 116. Lever member 118 is secured with the yoke member such that up and down movement of the lever member 118 as indicated by the arrow in FIG. 9 will result in up and down shifting of the shifting rod 104. The mechanism for shifting the lever member 118 up and down includes a bifurcated member 119 which includes apertures 119a (only one of which is shown) mounted on pins 120 (only one of which is shown) which are secured with the lever member 118. A piston rod 121 which is part of a conventional type power cylinder provides the up and down shifting of the bifurcated member 119 which in turn shifts the shifting rod 104. The power cylinder which may be of the pneumatic type in which case it would be of the type described above with reference to the clamping means CL and the clamping means CLx. It is understood that other suitable shifting means could be provided such as a hydraulic cylinder or an electric solenoid. It is also contemplated that the shifting means could be connected directly with the housing 110 in place of the shifting yoke member arrangement.

Another embodiment of the metal forming tool means 80 is shown in FIG. 12. This version includes numerous components in common with the version in FIG. 10 so corresponding components of the version of FIG. 12 are given the same reference numeral as their counterpart components in FIG. 10 with the subscript "X" added to the reference numerals in FIG. 12. The embodiment of FIG. 10 includes a housing means 82x which is mounted with the upper frame member 83 as is housing means 82. Rotatably mounted with housing means 82x is a rotating power-driven tool holder 88x which is supported with the housing through upper bearing means 89x and lower bearing means 90x. The inner cylindrical opening 88ax of the rotating tool holder 88x is eccentrically positioned in a like manner as the inner cylindrical openings of the above described tool holders. The lower metal forming tool component 101cx is rotatably mounted through bearings 98x and 99x and sleeve 100x so that the metal forming tool can freely rotate relative to the rotating tool holder. A shifting rod 104x having upper portion 106x and lower portion 105x is slidably mounted with the tool 101x in apertures 101bx and 101dx, rspecctively. The upper metal forming component 102x is identical to the component 102. Secured with the lower rod portion 105x is a cylindrical disk member 122.

The lower portion of the holder means 88x includes a longitudinally extending aperture 123 extending therethrough which receives additional splined shifting rod member 104x'. Mounted with the upper end of the shifting rod 104x' is a housing member 124 which includes an opening therein for mounting upper bearing means 125 and lower bearing means 126. A cylindrical flange member 127 is secured wiith the upper open end of the housing with suitable means such as bolts 128. The bearing means 125 and 126 enable the shifting rod 104x to remain stationary relative to the driven shifting rod 104x'. Thus upon rotation of the tool holder and engagement of the metal forming notch 103x with a work piece, the shifting rod 104x and the tool 101x will tend to remain substantially stationary relative to the rotating tool holder 88x and the rotating shifting rod 104x' as the tool rolls along the work piece. Lower disk member 109x is secured with the shifting rod 104x' to function similar to the disk member 109 as shown in FIG. 10 and described above. A housing means 110x which includes upper and lower bearing means 111x and 112x is secured with the disk 109x as also described above with reference to FIG. 10. An upper cap member 110ax secured with the housing means by suitable means such as bolts (not shown) or the like. The shifting yoke member 116x is secured on pin members 115x which pin members are mounted with the housing means by suitable threads 115ax. Lower splined shifting rod portion 129 is mounted with the disk 109x and is received by drive shaft 130 having internal splines 131. The drive shaft 130 is in turn connected to a motor means M' which motor is similar to the motor as shown in the embodiment of FIG. 6. It is understood that the shifting means, such as shown in FIG. 9, which includes a yoke member and shifting power cylinder, is provided for shifting of the rod 104x' and 104x which in turn shifts the upper metal forming component 102x in a similar manner to the embodiment described in FIG. 10. Splined shaft portion 129 retains a driving relationship between the tool holder 88x and the drive shaft 130. At least a portion of the shaft 104x' is splined which portion mates with matching splines in the longitudinally extending aperture 123 so as to maintain a driving relationship between the rod 104x' and the tool holder 88x. The splines permit longitudinal movement of the rod 104x' relative to the tool holder 88x while still maintaining a driving relationship therebetween.

The clamping means CL' can be used with the embodiment shown in FIGS. 5–6, FIG. 10 as well as that of FIG. 12. This clamping means includes a base portion 46' having supporting rollers (not shown) such as shown in FIGS. 5–6 for moving of the clamping means relative to the metal forming tool. Power cylinder 64' which operates the clamping means includes a piston member 65' and a piston rod 63'. The clamping means CL' includes a lower clamping member 49' having a rubber pad 50' secured therewith. The shape of the notched out portion 49a' is similar to the notched out portion 49a of the clamping means as shown in FIGS. 5 and 6. The lower clamping member 49' is fixably mounted with the power cylinder 64' with suitable connecting means such as connecting rods (not shown).

An upper clamping member 54' having a similar shape as that of the lower clamping member 49' is mounted above the lower clamping member and secured with the piston rod 63' by a suitable tap 58'. Rods 53' are secured wiith the lower clamping member and include a head portion 53a'. The upper clamping member 54' includes apertures 52' which slidably mount thhe upper clamping member on the rods 53. The upper clamping member includes a suitable notch portion 54a' and a protective rubber pad 55' which mates with the lower pad 50'. Hand grips 56' are secured with the upper clamping member for gripping by an operator as explained above. A button switch 132 is mounted with the right-hand hand grip which switch may for instance be connected to a solenoid means which operates an air valve which in turn operates the piston rod 121 by controlling a pneumatic cylinder (not shown) which the piston rod 121 forms a part of. Suitable control means are provided for selectively shifting the piston rod 63' to clamp thhe upper clamp member 54' against the lower clamp member 49' to grip a gasket in the clamping means. Instead of shifting the clamping means as shown in FIG. 7, the button switch 132 shifts the upper metal forming tool component 102 to the two positions best shown in FIG. 10 to perform the metal forming steps shown in FIGS. 11A, 11B and 11C. It is understood that suitable hydraulic lines and other control means such as used to operate the clamping means shown in FIGS. 5 and 6 are provided to operate the clamping means CL' as shown in FIG. 8.

Method of Operation

The method of operation of the first embodiment of this invention can be best understood with reference to FIGS. 3, 4 and 6. As described above, a gasket G is positioned in the clamping means CL as shown in FIG. 3 and the powwer cylinder 64 is activated to pull the upper clamp member 54 downwardly to securely grasp the gasket between the rubber pads 50 and 55. The longitudinal plane of the gasket coincides with the notch 28 in the metal forming tool as shown in FIGS. 2A and 2B.

This closing operation is shown in FIG. 3 where the metal forming tool 27 is shown engaged wiith the corner leg portion 24b of the gasket. This engagement is accomplished by an operator who shifts the clamping means CL on the rollers 47 using the hand grips 56. Upon engagement of the gasket with the notch of the metal forming tool, the metal forming tool will roll along the leg portion of the gasket to reduce friction sliding between the tool and the gaskket shell as the leg portion is bent downwardly as shown in FIG. 2B to a position flush with the closure member 25. Oil or graphite may be used on the tool to further reduce this friction. This closure of the corner leg portion 24b is accomplished by drawing the gasket cross bar along the notch in the metal forming tool as shown in FIG. 2B so that the hammering action of the tool will bend the corner leg portion downwardly. This requires a movement of the gasket to the right as shown in FIG. 3 of the clamping means CL and then a movement to the top of FIG. 3 to complete the closure of the gasket corner 22. The reciprocating hammering motion of the metal forming tool bends the corner leg portion 24b downwardly flush with the closure member 25 with a small amount of force applied to the hand grips 56 of the clamp means CL. The entire closure operation of each corner 22 can be accomplished in a matter of seconds by moving the gasket corner in engagement with the notch of the metal forming tool. During this engagement of the tool notch with the corner of the gasket, the springs 68 will be stretched as shown in FIG. 4 so that upon release of the hand grips 56 the clamping means will return to the position shown in FIG. 3. It will be understood that in actual operation the gasket G can be positioned toward the outer tips of the clamping members in order to close either gasket corner. When the gasket is in this position in the clamping means, one corner may be closed and then the operator may tilt the clamping means by pulling downwardly and backwardly on the hand grips to raise the cross bar 21 above the metal forming tool so that the cross bar may be shifted to close the other corner of the gasket.

During the engagement of the notch of the metal forming tool with the gasket corner, the metal forming tool substantially rolls along the gasket due to its bearing mounts 31 and 32 which allow it to rotate relative to the tool holder 34. This free rotational movement of the metal forming tool facilitates the bending of the corner leg portion 24b without tearing it during its metal forming operation which includes stretching of the metal at the corner. It has been found in actual practice that this free rotation of the metal forming tool relative to the tool holder helps to avoid tearing of the corner leg portion during the bending operation. It is also contemplated that a suitable lubricant could be used on the tool 27 as well as the metal forming tools of the other embodiments to reduce friction between the forming notch and the gasket shell during their engagement.

The operation of the embodiment shown in FIG. 7 is similar to that of the embodiment shown in FIGS. 5 and 6 except that two bending operations are performed to bend the corner leg portion 24b from a horizontal position to the position shown in FIG. 2A and then to a third closed position as shown in FIG. 2B. This operation is accomplished by supplying air to the power cylinder 64x to activate the upper clamp 54x to clamp the gasket in the clamping means. The gasket corner may then be engaged with the first forming tool 70 by an operator moving the clamping means with the hand grips 56x to perform the initial closing operation of the corner leg portion to its position shown in FIG. 2A. The gasket corner portion may be then disengaged from the metal forming notch and air may be supplied to the lower air supply lines 74 to force the piston 72 and piston rod 73 upwardly to shift the upper and lower clamps to the broken line position. The plane of the gasket G is then positioned in a plane corresponding to the upper notch 28x which is identical to the notch shown in FIGS. 2A and 2B so that the metal forming operation shown in FIGS. 2A and 2B may be performed. Suitable control means are provided for supplying air to the power cylinder 71 for performing this operation. During shifting of the power cylinder 71, the entire power cylinder 64x will be shifted upwardly along with the upper and lower clamp members 49x and 54x to the second position. This two step closing of the gasket corner eliminates the need for a separate operation in performing the initial closing step which is shown as having been performed on the gasket corner 24b as shown in FIG. 2B.

The method of operation of the embodiments shown in FIGS. 8–10 and the embodiments shown in FIG. 12 are similar in that the metal forming tools 81 and 81x are the same. Referring to FIG. 8, the gasket is first positioned between the upper and lower clamp members in a manner similar to that illustrated in FIGS. 3 and 4, described above, and the power cylinder 64' is activated to pull the upper clamp member 54' downwardly to tightly clamp the gasket between the clamp members. It is understood that the operator also activates a switch which supplies power to the motor M$y$, or the motor M in the case of the embodiment shown in FIG. 12, to rotate the respective tool holders. The rotation of the tool holder will impart a hammering-like motion to the metal forming tool for forming the shell of a double jacketed gasket. When the gasket is positioned within the clamping means the operator can grip the hand grips 56' to move the corner of the gasket into engagement with the metal forming tool, such as shown in FIGS. 3 and 4.

The corner of the gasket in its unclosed condition appears in cross-section as shown in FIG. 11A. The initial step involved in closing the gasket is to bennd the leg member 24b from its horizontal position as shown in FIG. 11A to an upwardly extending position as shown in FIG. 11B. For this bending step, the upper metal forming tool component is positioned as shown in broken lines in FIG. 10. This position may coincide with the button switch 132 not being depressed. The operator may then engage the gasket corner with the metal forming tool notch 103 whereby the hammering action of the metal forming tool will bend the gasket corner 24b to the position shown in FIG. 11B. During this engagement, the bearings 98 and 99 will permit the metal forming tool to roll along the edge of the gasket to help prevent tearing of the metal during the bending and stretching operation. It is understood that this occurs while the tool holder is rotated at a relatively high speed to impart the hammering motion.

Once the leg member 24b is bent upwardly as shown in FIG. 11B, the operator may depress the button switch 132. Depressing of the button switch 132 results in an upward movement of the piston rod 121 which causes the sliding rod 104 to be shifted downwardly so as to position the upper metal forming component as shown in solid lines in FIG. 10. In this position, the shape of notch 103 substantially corresponds to the shape of the notch 28 as shown in FIGS. 2A and 2B. The notch 103 prior to the downward shifting of the tool component 102 substantially conformed to the notch 70 as shown in FIG. 7 when the component 102 was in its broken line position shown in FIG. 10. Accordingly, subsequent engagement of the gasket corner leg portion, which leg portion is in the position as shown in FIG. 11B, will result in a further bending of the gasket corner 24b to a fully closed position as shown in FIG. 11C. The closing of the gasket corner will tend to depress the portion of the member 25 which underlies the leg 24b which is exaggerated somewhat in FIG. 11C for illustrative purposes.

The operation of the embodiment shown in FIG. 12 is substantially identical to that of the operation of the embodiment shown in FIGS. 8–10 and differs only in the manner in which the motor supplies a rotating driving force to the tool holder. It is understood that with the embodiment shown in FIG. 12, the sliding rod 104x' rotates with the tool holder while the sliding rod portion 104x rotates with the tool 101 upon engagement of the notch 103x with the corner of a gasket. The bearings 125 and 126 are conventional thrust bearings which allow rotation and lateral shifting of the sliding rod 104x relative to the sliding rod 104x'.

The shifting metal forming tool shown in FIGS. 10 and 11 provides the two-step closing operation shown in FIGS. 11A, 11B and 11C in the same manner as the closing steps of the embodiments shown in FIG. 7. However, the shifting metal forming tool can be used with a clamping means which is stationary as opposed to the shifting clamping means shown in FIG. 7. The shifting clamping means as shown in FIG. 7 could be combined with a shifting metal forming tool such as shown in FIG. 10 or FIG. 12 should an additional metal forming notch portion be provided above the upper tool component 102. Such a construction would provide for as many as three steps in performing the closing operation to achieve the results shown in FIG. 11C.

While the apparatus and methods described above are particularly useful in closing the corner of a double jacketed gasket, it is understood that this device could also be used to close the entire leg portion or any part of the gasket G. This may be accomplished by clamping a desired part of the gasket in the clamping means CL, CLx or CI' and engaging this part of the gasket with the metal forming tool. The metal forming tool will roll along this part of the gasket as the operator draws the clamping means and gasket along the notch of the metal forming tool.

The foregoing disclosure and description of the invention are illustrative and explanatory thereof and various changes in the size, shape and materials as well as in the details of the illustrated construction may be made without departing from the spirit of the invention.

We claim:

1. A metal forming apparatus for closing the metal shell at a corner of a double jacketed gasket assembly, comprising:
    rotatable roller hammer means having a notch which is substantially U-shaped in cross-section for engaging a portion of the gasket shell to be closed; and
    power means operably connected with the rotatable roller hammer means for reciprocating the rotatable roller hammer means relative to said metal shell for bending the metal shell without tearing it.

2. The apparatus as set forth in claim 1, wherein:
    the rotatable roller hammer means has bearing means for providing rotation of the roller hammer means relative to the power means for bending the metal shell without tearing it.

3. The apparatus as set forth in claim 1, wherein:
    the notch is circumferential for engaging a metal shell of a corner of a gasket to close the metal shell without any tearing of the metal.

4. The apparatus as set forth in claim 1, wherein:
    the rotatable roller hammer means has mounting means for providing rolling of the reciprocating roller hammer means along the metal shell to close the gasket corner without tearing it.

5. The apparatus as set forth in claim 1, wherein:
    the power means has a rotating mounting means for providing the reciprocating hammering motion to the rotatable roller hammer means.

6. The apparatus as set forth in claim 5, wherein:
    the mounting means is rotatably driven about a first axis of rotation; and
    the rotating roller hammer means is mounted with the mounting means for relative rotation about a second axis of rotation eccentrically positioned from the first axis to provide the reciprocating hammering motion between the roller hammer means and the metal shell for bending the metal shell without tearing it.

7. The apparatus as set forth in claim 6, wherein:
    the roller hammer means has two metal forming components concentric with the second axis of rotation which form the notch engaging portion;
    shifting means for shifting one of the components between two positions for changing with width of the engaging portion.

8. The apparatus as set forth in claim 7, wherein:
    the shifting means longitudinally shifts at least one of the components along the second axis of rotation which changes the width of the notch portion.

9. The apparatus as set forth in claim 1, including:
    a means for holding a double jacketed gasket for closing the metal shell of a corner of the gasket when the gasket shell is engaged with the tool means.

10. The apparatus as set forth in claim 9, wherein:
    the gasket holder means is movable relative to the roller hammer means to engage the gasket shell with the roller hammer means.

11. The apparatus as set forth in claim 9, wherein:
    the gasket holder means has roller means supporting the holder means for relative movement of the holder means to the roller hammer means to engage the gasket shell with the roller hammer means.

12. The apparatus as set forth in claim 9, wherein:
    the holder means is a clamp means having a stationary clamping member and a movable clamping member; and
    power means connected with the members for clamping a work piece between the members.

13. The apparatus as set forth in claim 9, including:
    the roller hammer means having axially spaced first and second means for forming sheet metal; and
    means mounting the gasket holder means for movement between first and second positions for positioning a gasket in line for engagement with the first and second forming means.

14. The apparatus as set forth in claim 13, wherein:
    the notch is circumferential and is formed between and by the shape of said first and second forming means for bending a corner of a gasket metal jacket from an unclosed position to a partially closed position; and
    means for moving said first forming means longitudinally relative to the second forming means for bending the metal jacket from the partially closed position to a fully closed position.

15. The apparatus as set forth in claim 1, including:
    shifting means for changing the width of the U-shaped engaging portion of the roller hammer means for closing the shell in at least two steps.

16. The apparatus as set forth in claim 15, wherein:
    the roller hammer means has two metal forming components which form the notch engaging portion; and
    the shifting means shifts one of the components between two positions for changing the widths of the engaging portion.

17. The apparatus as set forth in claim 16, wherein:
    the notch portion of the metal forming components is circumferential for closing the corner of a double jacketed gasket.

* * * * *